United States Patent
Ståhl

(10) Patent No.: US 9,565,172 B2
(45) Date of Patent: Feb. 7, 2017

(54) METHOD FOR ENABLING A SECURE PROVISIONING OF A CREDENTIAL, AND RELATED WIRELESS DEVICES AND SERVERS

(71) Applicant: Telefonaktiebolaget L M Ericsson (publ), Stockholm (SE)

(72) Inventor: Per Ståhl, Klagshamn (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 14/654,583

(22) PCT Filed: Jun. 17, 2015

(86) PCT No.: PCT/EP2015/063536
§ 371 (c)(1),
(2) Date: Jun. 22, 2015

(65) Prior Publication Data
US 2016/0373418 A1 Dec. 22, 2016

(51) Int. Cl.
*H04L 29/06* (2006.01)
*H04L 9/32* (2006.01)
(Continued)

(52) U.S. Cl.
CPC ........... *H04L 63/062* (2013.01); *H04L 9/0838* (2013.01); *H04L 9/3242* (2013.01); *H04L 9/3247* (2013.01);
(Continued)

(58) Field of Classification Search
CPC .... H04L 63/062; H04L 9/0838; H04L 9/3242; H04L 9/3247; H04L 9/3263; H04L 63/0435; H04L 63/08; H04W 12/04
(Continued)

(56) References Cited

U.S. PATENT DOCUMENTS 7,549,048 B2    6/2009  Freeman et al.
7,756,509 B2 *  7/2010  Rajagopalan ......... H04L 63/102
                                                       455/410
(Continued)

FOREIGN PATENT DOCUMENTS

WO      2015036773 A2     3/2015

OTHER PUBLICATIONS

Menezes, A., et al., "Handbook of Applied Cryptography", Aug. 31, 2001, pp. 283-285 [08.1], 364 [9.6.3]—[9.6.4], 403-405 [10.3.3], 515-520 [12.6.1], retrieved on Feb. 10, 2016, retrieved from Internet: http://cacr. uwaterloo.ca/hac.

*Primary Examiner* — Michael S McNally
(74) *Attorney, Agent, or Firm* — Coats & Bennett, PLLC

(57) ABSTRACT

This disclosure provides a method, performed in a wireless device 60, for enabling a secure provisioning of a credential from a server 70. The wireless device 60 stores a device public key and a device private key. The server 70 stores the device public key. The method comprises receiving S1 an authentication request from the server 70; generating S2 a device authentication and integrity, DAI, indicator; and transmitting S3 an authentication response to the server 70. The authentication response comprises the DAI indicator. The method comprises receiving S4 a credential message from the server 70, the credential message comprising a server authentication and integrity, SAI, indicator. The SAI indicator provides a proof of the server's possession of the device public key. The method comprises verifying S5 the received credential message using the device public key.

45 Claims, 7 Drawing Sheets

(51) Int. Cl.
*H04L 9/08* (2006.01)
*H04W 12/04* (2009.01)

(52) U.S. Cl.
CPC ......... *H04L 9/3263* (2013.01); *H04L 63/0435* (2013.01); *H04L 63/08* (2013.01); *H04W 12/04* (2013.01)

(58) Field of Classification Search
USPC .......................................................... 713/170
See application file for complete search history.

(56) References Cited

U.S. PATENT DOCUMENTS

| | | |
|---|---|---|
| 8,874,914 B2 | 10/2014 | Stauth et al. |
| 2011/0138380 A1* | 6/2011 | Sharaga ................ G06F 21/305 717/178 |
| 2011/0305338 A1* | 12/2011 | Rogan ................... H04W 12/02 380/270 |
| 2012/0117635 A1* | 5/2012 | Schell ..................... G06F 21/34 726/9 |
| 2012/0239936 A1 | 9/2012 | Holtmanns et al. |
| 2015/0095648 A1 | 4/2015 | Nix |

* cited by examiner

METHOD FOR ENABLING A SECURE PROVISIONING OF A CREDENTIAL, AND RELATED WIRELESS DEVICES AND SERVERS

TECHNICAL FIELD

The present disclosure relates to security and in particular to credential provisioning. More specifically, the present disclosure relates to a method for enabling a secure provisioning of a credential from a server to a wireless device, and related wireless devices and servers.

BACKGROUND

It is envisioned that 50 billion devices will be connected to the Internet in 2020 and that the Internet Of Things, IoT, where wireless devices such as sensors, light bulbs, etc. are connected, will be a major part of the connected devices. Security is very important for these wireless devices. For example, it is important to make sure that data delivered from sensors ends up in the right hands and that it has not been tampered with, and that sensitive data from these sensors is not exposed.

Another example is the need to prevent tampering of data sent to and from control devices such as door locks or pacemakers, for which tampering could have serious consequences on people's properties or health. Not only should the wireless device itself and the service provided by the wireless device be protected (e.g. secure communication between the wireless device and server to which the wireless device delivers sensitive sensor data), but also device management (such as SW update and configuration of the device) and service registration and enablement needs to be handled in a secure manner. Hence, it is important to prevent that a man-in-the-middle manipulates the SW, puts the wireless device into a faulty/unsecure configuration, or makes the wireless device register to a rogue server.

Wireless devices are typically constrained devices with limited computing and communication power and memory. For such wireless devices, several standards have been proposed in various standardization forums. One of these standards is the lightweight machine to machine, LwM2M, protocol that provides means for bootstrapping, registration, management, service enablement, and information reporting of constrained wireless devices. The LwM2M protocol runs on top of constrained application protocol, CoAP, which is a representation state transfer, REST-ful application protocol for constrained devices recently standardized by IETF. Both LwM2M and CoAP mandate the use of datagram transport layer security, DTLS for secure communication including mutual authentication between a wireless device and a server (bootstrapping server, device management server, or data reporting server).

CoAP and LwM2M specifications describe three modes in which DTLS is to be used and specify mandatory DTLS cipher suites to be used:

DTLS with pre-shared key: a pre-shared key between the wireless device and the server is used.

DTLS with public-private key pairs in raw-public-key, RPK, mode: both wireless device and server has an individual public-private elliptic curve cryptographic key pair used for mutual authentication and the RPK format is used to transfer keys between the IoT device and the server in order to avoid certificates and save memory and processing power in the wireless devices.

DTLS with certificates: both wireless device and server has individual public-private elliptic curve cryptographic key pairs and corresponding certificates certifying their public keys. Private keys and certificates are used for mutual authentication.

To allow the constrained wireless device to establish DTLS session with different servers in any of these modes, it is necessary to provide credentials to the constrained wireless device such as a pre-shared key, a public-private key pair, and certificates. However, the constrained wireless device very often lacks interface and display for the user/enterprise that owns the device to be able to manually configure the wireless devices with credentials. Often, the only interface of a wireless device of machine type is the network interface. In many cases, the user/enterprise buys hundreds or thousands of wireless devices and then manual configuration of each device is too time consuming. Often, the wireless device may have been pre-configured with some credentials at the manufacturer of the wireless device but still need to be provided with device credentials that support the wireless device in securely operating in the user/enterprise network.

The phase in which the wireless device is initially provisioned with credentials is called the bootstrapping phase. In this phase, a bootstrapping server, BS, is involved in the provisioning of credentials to the wireless device. We consider the case where the wireless device is provisioned with an individual public-private key pair at manufacturing. For a secure bootstrapping, the manufacturer needs to provide the wireless device at manufacturing with a manufacturer public key/certificate such that mutual authentication is possible between the wireless device and the manufacturer BS (e.g. using DTLS) ensuring the device that it is communicating with a legitimate manufacturer BS server, and such that secure communication is established for delivering the user/enterprise BS URL and possibly credentials that are needed for the wireless device to securely connect to the user/enterprise BS. The wireless device may then proceed to the bootstrapping phase with the enterprise BS where provisioning of device credentials needed to securely connect to enterprise servers is done. To achieve a secure and successful bootstrapping with the enterprise BS, the wireless device and the enterprise BS are to mutually authenticate, and establish a secure connection for provision of the device credentials so that the wireless device can securely operate within the enterprise network. However, a protocol achieving a secure connection for credential provisioning needs to be as lightweight as possible to be supported by the wireless IoT devices.

US20150095648 shows a secure communication for "Machine-to-Machine", M2M, between modules and servers. The module and server can utilize public key infrastructure (PKI) such as public keys to encrypt messages. The module and server can use private keys to generate digital signatures for datagrams sent and decrypt messages received. The module can internally derive pairs of private/public keys using cryptographic algorithms and a set of parameters. A server can use a shared secret key to authenticate the submission of derived public keys with an associated module identity. For the very first submission of a public key derived by the module, the shared secret key can comprise a pre-shared secret key which can be loaded into the module using a pre-shared secret key code. This document makes use of an additional pre-shared secret to transfer a public key generated at the module to the server, which is an additional cryptographic material. Having an additional cryptographic material is a sub-optimal solution for wireless IoT devices where resources are constrained and the amount or number of cryptographic material is to be kept to a minimum.

Hence, there is a need for a lightweight security protocol to enable secure provisioning of device credentials to a wireless device from a server.

SUMMARY

An object of the present disclosure is to provide methods, wireless devices, and servers which seek to mitigate, alleviate, or eliminate one or more of the above-identified deficiencies in the art and disadvantages singly or in any combination.

This object is obtained by a method, performed in a wireless device, for enabling a secure provisioning of a credential from a server. The wireless device stores a device public key and a device private key. The server stores the device public key. The method comprises receiving an authentication request from the server; generating a device authentication and integrity, DAI, indicator; and transmitting an authentication response to the server. The authentication response comprises the DAI indicator. The method comprises receiving a credential message from the server, the credential message comprising a server authentication and integrity, SAI, indicator. The SAI indicator provides a proof of the server's possession of the device public key. The method comprises verifying the received credential message using the device public key.

The present disclosure provides a lightweight technique for enabling a provisioning of a credential to the wireless device from a server, where the credential provisioning is secured using the device public key as a shared secret. There is thus no need for a cryptographic material dedicated to credential provisioning, as the device public key is used herein for securing the credential provisioning before being exposed. The wireless device can then reduce the memory usage for storing cryptographic material and only store the device public key and device private key. The object is furthermore obtained by a method, performed in a server, for securely providing a credential to a wireless device. The server stores a device public key for the wireless device, a server public key and a server private key. The method comprises transmitting an authentication request to the wireless device. The method comprises receiving an authentication response from the wireless device. The authentication response comprises a device authentication and integrity, DAI, indicator. The method comprises verifying the received authentication response using the DAI indicator and the device public key. The method comprises, upon successful verification of the authentication response, generating a server authentication and integrity, SAI, indicator based on the device public key. The SAI indicator provides a proof of the server's possession of the device public key. The method comprises transmitting a credential message to the wireless device. The credential message comprises the generated SAI indicator.

The methods disclosed herein allow flexibility in manufacturing the wireless devices as the manufacturer neither have to provision at manufacturing the wireless devices delivered to the enterprise with the enterprise credentials nor provide a post-production service (through a manufacturer bootstrapping server) to the enterprise for secure provisioning of the enterprise credentials. The methods disclosed herein still enable a secure credential provisioning with the already stored and unexposed device public key.

There is also disclosed herein a wireless device. The wireless device comprises an interface configured to communicate with a server. The wireless device comprises a memory unit having a device public key and a device private key stored thereon. The wireless device comprises a processor configured to receive an authentication request from the server via the interface. The processor is configured to generate a device authentication and integrity, DAI, indicator. The processor is configured to transmit, via the interface, an authentication response to the server. The authentication response comprises the DAI indicator. The processor is configured to receive, via the interface, a credential message from the server. The credential message comprises a server authentication and integrity, SAI, indicator. The SAI indicator provides a proof of the server's possession of the device public key. The processor is configured to verify the received credential message using the device public key.

This disclosure also relates to a server configured to securely provide a credential to a wireless device. The server comprises an interface configured to communicate with the wireless device. The server comprises a memory unit having stored a device public key for the wireless device, a server public key and a server private key. The server comprises a processor configured to transmit, via the interface, an authentication request to the wireless device. The processor is configured to receive, via the interface, an authentication response from the wireless device. The authentication response comprises a device authentication and integrity, DAI, indicator. The processor is configured to verify the received authentication response based on the DAI indicator and the device public key. The processor is configured to generate, upon successful verification, a server authentication and integrity indicator based on the device public key. The SAI indicator provides a proof of the server's possession of the device public key. The processor is configured to transmit, via the interface, a credential message to the wireless device. The credential message comprises the generated SAI indicator.

In addition to the above methods, there is also provided herein computer programs comprising computer program code which, when executed in a wireless device, causes the component, to execute methods according to the present teaching.

In addition to the above methods, there is also provided herein computer programs comprising computer program code which, when executed in a server, causes the component, to execute methods according to the present teaching.

The computer programs, the wireless devices, and the servers provide advantages corresponding to the advantages already described in relation to the methods.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
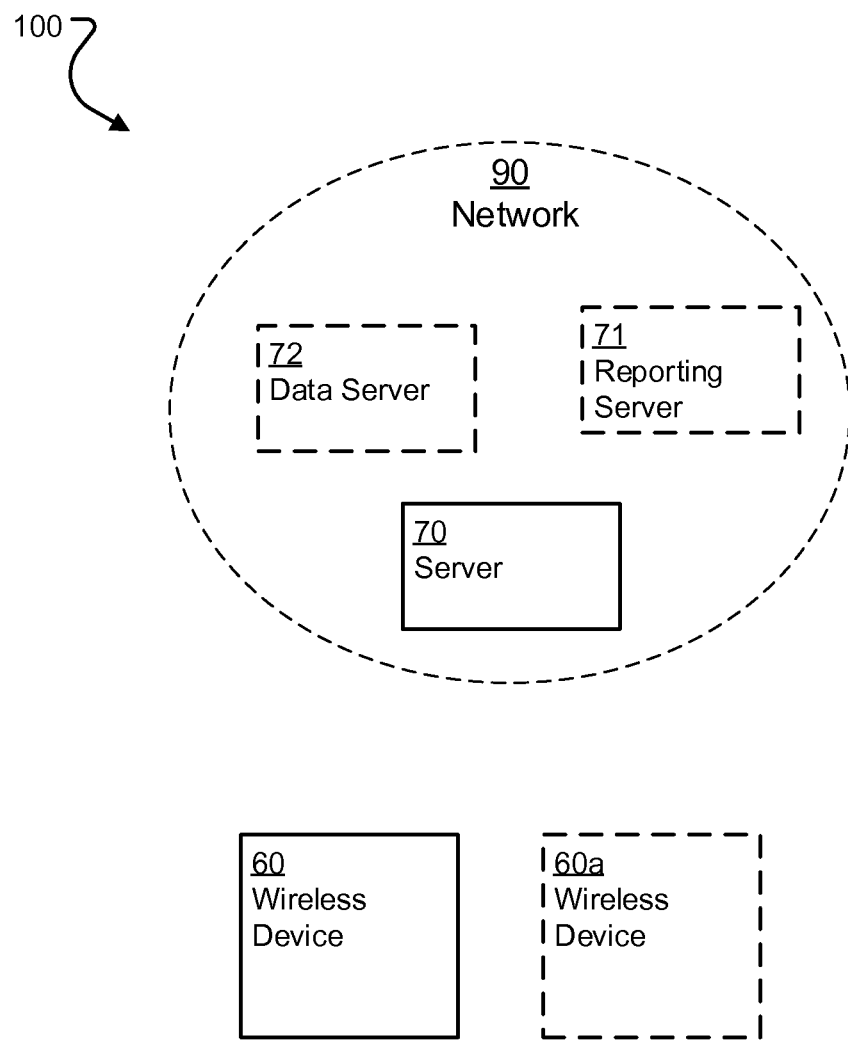
FIG. 1 is a system diagram illustrating an exemplary communication network, an exemplary wireless device, and an exemplary server according to this disclosure.

The present teaching relates to methods for enabling secure provisioning of credentials to a wireless device from a server; and to related wireless devices and servers.

The present technique is applicable to any electronic system as well as to any wireless communication system where there is a need for a secure credential provisioning of a wireless device that is lightweight in terms on memory usage, and/or computational overhead.

The various components referred to herein are according to different aspects implemented as, e.g., application-specific integrated circuit, ASIC, field-programmable logic array, FPGA, or general purpose processor.

As mentioned in the background section, when an enterprise or a user buys a lot of wireless devices from a manufacturer/retailer, the wireless devices are likely to be pre-configured at manufacturing with some credentials, such as a device public-private key pair used for e.g. securing sessions with another party (such as based on DTLS or TLS). The enterprise obtains a list with the public keys and identifiers of all the bought devices, for example on some electronic media (e.g. a CD). It is assumed in this example that the credentials are to be provided for bootstrapping purposes. As the credentials such as a URL of the enterprise bootstrapping server, BS, and keys/certificates for secure communication with the enterprise BS is not known at the time of the manufacturing, the manufacturer cannot provide these credentials into the wireless device at manufacturing. Instead, the manufacturer sets up a manufacturer BS or licenses a bootstrapping service for enabling and supporting enterprise bootstrapping without having to provide wireless devices with specific configuration for each enterprise. The manufacturer is thus able to provide to the wireless device at manufacturing only the following credentials: a URL of the manufacturer BS, and/or a public key of the manufacturer BS. Upon acquisition of the wireless devices by the enterprise, the manufacturer BS registers the enterprise and requests/holds data that permits secure communication to one of the enterprise bootstrapping servers. An approach is for the manufacturer BS to register a URL of the enterprise BS. When the wireless device is started up for the first time by the enterprise, the wireless device retrieves the URL of the manufacturer BS from its memory, and connects to the manufacturer BS which then provides the wireless device with the URL of the enterprise BS for enterprise bootstrapping. However, the wireless device has to be prevented from connecting to a rogue enterprise BS and from being under a possible man-in-the middle attack when attempting to communicate with the enterprise BS. The credential provisioning from the enterprise server is thus to be secured against these attacks during bootstrapping.

A prior art approach to securing the credential provision to the wireless device from the enterprise BS is that the manufacturer BS further registers the public key (or a certificate authority, CA, certificate enabling the device to trust to the enterprise BS) of the enterprise BS together with its URL upon purchase from the enterprise. When the wireless device is started up for the first time by the enterprise, the wireless device connects to the manufacturer BS which then provides the wireless device with the URL of the enterprise BS and the public key (or the CA certificate) of the enterprise BS. With this approach, the wireless device needs to store the device public-private key pair (and possible device certificate), the URL of the manufacturer BS, the URL of the enterprise BS, the public key of the enterprise BS, and possibly the CA certificate of the enterprise BS, as well as other credentials needed for the service that the wireless device is to offer (such as sensor data). Storing such an extensive amount of credentials is disadvantageous in a wireless device which has limited memory, such as an IoT device.

The present disclosure proposes to secure the provisioning of credentials from the enterprise server, such as an enterprise BS, to the wireless device using the device public key as a shared secret. As the device public is not yet exposed to other devices (except, of course, the wireless device and the enterprise BS) or the public (i.e. has not been published or made publicly available) when initiating the credential provisioning, the device public key can serve as a shared secret between the wireless device and the enterprise BS for securing delivery of the credentials to the wireless devices and can serve as a publicly available device public key after the secure credential provisioning (and be exposed). Without knowledge of the device public key, an attacker is unable to trick the device into accepting a rogue server public key, and thus to perform a man-in-the-middle attack. The proposed technique is also applicable to securing communication between the wireless device and the manufacturer BS. Thus, the present disclosure allows using an already initially provisioned material, i.e. the device public key, as a shared secret to securely communicate with any of the enterprise server, and the manufacturer server. This enables a secure provisioning of the credentials to the wireless device from any of the servers while maintaining a reduced memory usage for storing credentials. This provides the manufacturer with flexibility in manufacturing the wireless devices as the manufacturer does not have to provision at manufacturing the wireless devices delivered to the enterprise with neither the enterprise credentials nor manufacturer credentials for secure communication with the manufacturer BS.

Aspects of the present disclosure will be described more fully hereinafter with reference to the accompanying drawings. The methods, wireless devices, servers disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

As used herein, the term "credential" refers to a cryptographic material that contributes in establishing an identity of a party to a communication, securing the communication to the party, accessing a resource (e.g. a network, a server). A credential comprises a security credential, such as a bootstrapping credential. A credential can be self-issued or issued by a trusted third party. A credential is for example a certificate, a cryptographic key, a biometrics, an identifier and/or a password. Examples of cryptographic keys include a public key, a private key, and/or a symmetric key.

The term "a transport layer security", TLS, comprises TLS protocol, a datagram transport layer security, DTLS, protocol, and/or a datagram transport layer security protocol with an extension for secure real-time transport protocol, DTLS-SRTP. DTLS can be advantageous for constrained wireless devices using low-power short range radio communication such as Bluetooth Smart, IEEE 802.15.4 radios as DTLS is able to accommodate lost or reordered packets. The pre-shared key, raw public key, and certificate modes described in the background are applicable also for TLS and DTLS-SRTP. The present technique is applicable to any transport security protocol such as the protocols in the TLS family.

FIG. 1 shows a system 100 diagram illustrating an exemplary wireless device 60, an exemplary server 70, and an exemplary network 90 according to the present disclosure. In this disclosure, the term "wireless device" used herein refers to a device that has wireless communication capabilities as well as memory and computational capabilities. A wireless device is for example user equipment, a network node, and/or a relay node. A wireless device is for example a mobile terminal, or a fixed terminal. A wireless device may be a device comprising a universal integrated circuit card configured to communicate.

According to some aspects, the wireless device 60 is a resource-constrained device. The term "resource-constrained device" used herein refers to a device that has limited communication capabilities, limited memory, limited computational capabilities, and/or limited battery life. A resource-constrained device is for example an IoT device, and/or a sensor such as a low power sensor. A resource-constrained device may be a device comprising a universal integrated circuit card configured to communicate. A resource-constrained device may be a mobile resource-constrained device, or a fixed resource-constrained device. Examples of resource-constrained devices include monitoring implants, biochip transponders, smart thermostat, smart metering devices, and smart appliances. A resource-constrained device has for example such limited resources that the resource-constrained device is unable to independently perform some tasks required to perform an operation. A resource-constrained device has for example such limited resources that performing such tasks would drain all its resources and would result in the device being non-operational.

According to some aspects, the wireless device 60 connects with the network 90 for bootstrapping, registration, management, service enablement, and information reporting. The network 90 comprises one or more servers 70 configured to manage, control and/or support the wireless device 60, such as a bootstrapping server, an authentication center server, an authentication authorization and accounting server, a reporting server 71, a data server 72, such as a management server. A wireless device for example communicates with one server for device management and service enablement and at least with one more servers for the service (e.g. sensor data reporting). A server has more resources, such as communication capabilities, power, memory and a computational capability, than a wireless device that is resource-constrained. The server 70 comprises a server of the manufacturer (such a manufacturer BS), and a server of the enterprise network (such an enterprise BS). A server is configured to communicate with the wireless device 60 via a wireless communication interface, and/or a wired communication interface. A wireless device is according to some aspects configured to act as a client, such as a client of the security protocol, such as a client of a transport layer security, TLS, protocol. The term "client" is used to refer to a device configured to act as a client. The term "server" may be used to refer to an apparatus configured to act as a server in a protocol, such as a security protocol, such as a bootstrapping protocol. The client-server characteristic describes the relationship of cooperating apparatuses or programs in an apparatus. A server provides a function or service to one or more clients, which initiate requests for such functions or services. A client, such as the wireless device 60, 60a, and a server, such as the server 70, exchange messages in a request-response messaging pattern: the client sends e.g. a request, and the server returns e.g. a response.

A client and/or a server may comprise a user equipment, a network equipment and/or a peer in a peer-to-peer system. Alternatively, a client is a user equipment while a server is a network node. The wireless device 60, 60a and the server 70 are for example apparatuses configured to act as a client/server of a protocol, such as a security protocol, and/or a bootstrapping protocol.

The network 90 comprises for example an enterprise network, and/or a local area network. The network 90 comprises for example a home network, and/or a visited network. According to some aspects, the network 90 comprises a wired communication network, and/or a wireless communication network. A wired communication network comprises e.g. an Internet protocol-based communication network, a fiber-optic communication network, a telephone network, and/or a cable network. A wireless communication network comprises for example a short range communication network (e.g. Bluetooth, ZigBee, near field communication, IEEE 802.15), a wireless local area network, WLAN, and/or a cellular network such as 3GPP long term evolution, LTE, system, and a wideband code division multiple access, WCDMA system.

Figure 2:
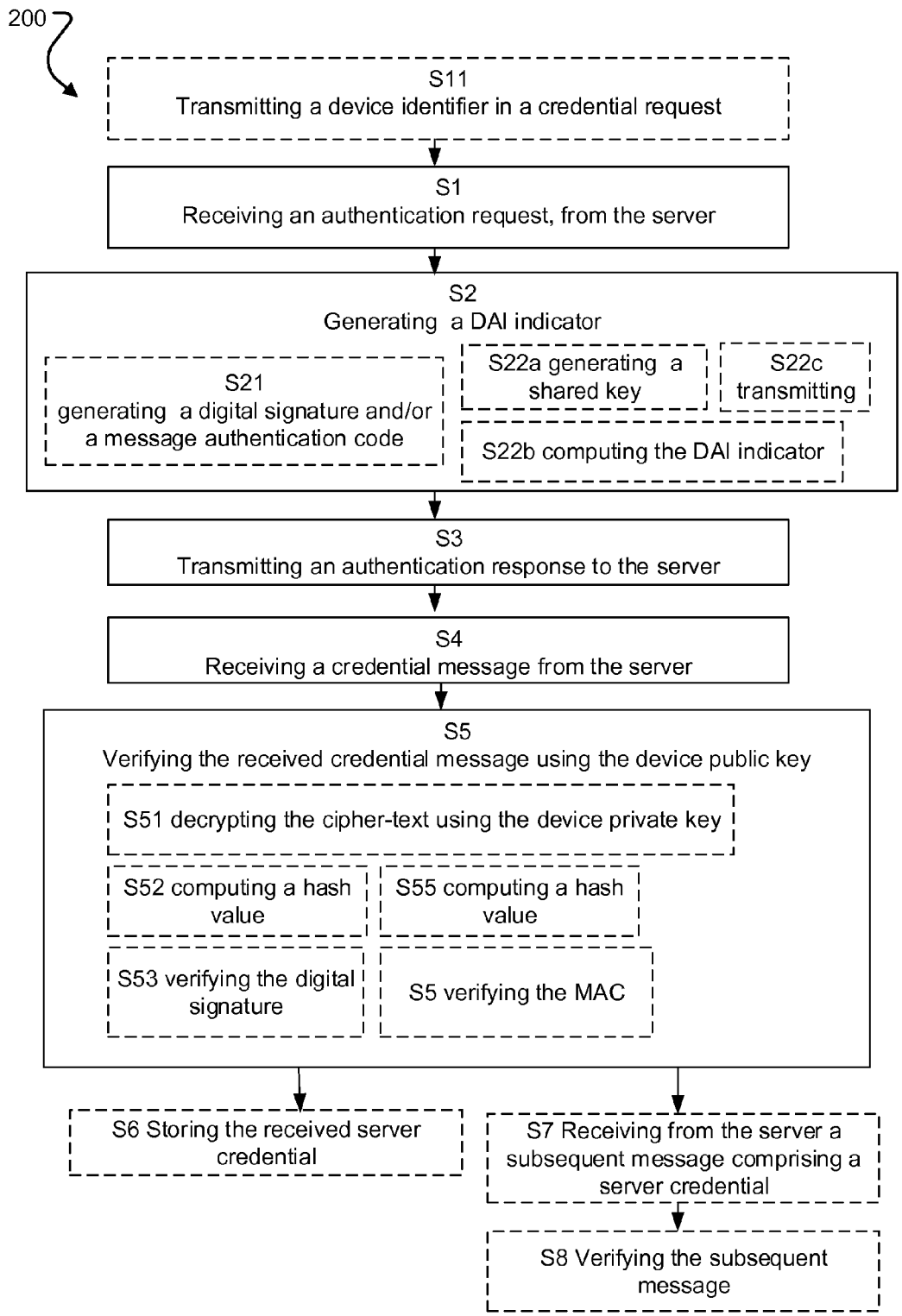
FIG. 2 is a flow chart illustrating an exemplary method, performed in a wireless device according to this disclosure.

FIG. 2 shows a flowchart illustrating exemplary methods 200 performed in a wireless device according to some aspects of this disclosure. For example, an enterprise purchases wireless devices 60, 60a from a manufacturer. The manufacturer has upon purchase, provided the enterprise with the device public key, and possibly a device identifier. The enterprise then provides the device public key, and possibly the device identifier for each purchased wireless device 60 to a server 70 of the enterprise. When the wireless device 60, 60a starts up for the first time within the enterprise network, the wireless device needs to be provided with credential that allows the wireless device 60, 60a to operate within the enterprise network. The device public key has not been made public by the wireless device, by the enterprise and/or by any other possible holder of the device public key. To enable secure provision of the credential from a server 70 of the enterprise network, the wireless device 60 performs methods 200.

Methods 200 are for enabling a secure provisioning of a credential from a server 70, such as a secure delivery of the credential from the server 70 to the wireless device 60. The wireless device 60 stores a device public key and a device private key. The manufacturer BS provides for example the device public key and a device private key to the wireless device upon manufacturing. The device public key has not yet been exposed to the public and not used for any communication when provided to the wireless device at this stage. The server 70 stores the device public key, which is for example provided to the server by the manufacturer or retailer upon acquisition of the wireless device 60. The method 200 comprises receiving S1 an authentication request from the server 70. For example, in TLS with pre-shared key, the step of receiving S1 comprises receiving a ServerHello message, a ServerKeyExchange message, a ServerHelloDone message, and possibly a Certificate message from the server 70.

The method 200 comprises generating S2 a device authentication and integrity, DAI, indicator. The DAI indicator refers herein to data that allows the server 70 to authenticate the wireless device 60 and to verify the integrity of the credential message. The DAI indicator supports the server 70 in determining whether the wireless device 60 is a legitimate wireless device (i.e. whether the wireless device 60 holds the device public key). According to some aspects, the DAI indicator comprises a digital signature computed based on the device private key, and/or a message authentication code computed based on the device public key. For example, generating the DAI indicator as digital signature comprises digitally signing the authentication response payload using the device private key. For example, generating the DAI indicator as a message authentication code, MAC, comprises generating a MAC over the authentication response payload using the device public key; or generating a key derived from the device public key and computing the MAC over the authentication response payload using the derived key. The MAC is generated using a MAC generation function, such as a keyed Hash-MAC, HMAC, function, a one-time MAC function, and a block cipher. A MAC herein refers to an integrity indicator computed from a message and some shared secret, such as the device public key herein or any key derived from the device public key. It is difficult to forge without knowing the shared secret. A MAC purpose is to detect if the message has been altered. According to some aspects, the authentication request comprises a server nonce; and the step of generating S2 the DAI indicator comprises generating S21 a digital signature over the server nonce using the device private key and/or a message authentication code over the server nonce using the device public key. For example, generating a message authentication code, MAC, comprises generating a key derived from the device public key and computing the MAC over the server nonce using the derived key. As used herein the term "nonce" refers to an arbitrary number used only once in a cryptographic communication. Examples of nonce include a random number or a pseudo-random number. According to some aspects, the authentication request comprises a server nonce encrypted using the device public key or a key derived from the device public key and the step of generating S2 the DAI indicator comprises decrypting the encrypted server nonce using the device private key or a key derived from the device public key and returning the server nonce in the authentication response.

The method 200 comprises transmitting S3 an authentication response to the server 70. The authentication response comprises the DAI indicator. For example, in TLS with pre-shared key, the step of transmitting S3 comprises transmitting to the server 70 a ClientKeyExchange message, a ChangeCipherSpec message, and/or a Finished message.

The method 200 comprises receiving S4 a credential message from the server 70. When receiving S4 the credential message from the server 70, the device public key has not been made public by the wireless device 60, by the server 70 and/or by any other possible holder of the device public key. The credential message comprises a server authentication and integrity, SAI, indicator. The SAI indicator provides a proof of the server's possession of the device public key. The SAI indicator permits the wireless device 60 to authenticate the server 70 and to verify the integrity of the credential message. As only the legitimate server 70 holds the device public key, the SAI indicator if generated by the legitimate server permits a verification of the server's possession of the device public key and thus also a successful authentication of the server as legitimate. For example, in TLS with pre-shared key, the step of receiving S4 comprises receiving a ChangeCipherSpec message, and/or a Finished message from the server 70.

The method 200 comprises verifying S5 the received credential message using the device public key. For example, verifying S5 comprises authenticating a sender of the credential message, i.e. the server 70, and/or verifying integrity of the credential message, i.e. verifying that the credential message has not been tampered with. Authenticating the sender of the credential message and/or verifying integrity of the credential message is performed for example using the SAI indicator and the device public key. According to some aspects, the SAI indicator comprises a digital signature; and the step of verifying S5 the received credential message comprises verifying S53 the digital signature. For example, the server generates a digital signature, as SAI indicator, of a concatenation of a server nonce, a device nonce, a device public key and a server public key. For example, verifying S53 the digital signature at the wireless device 60 comprises verifying the digital signature using the server public key. Digital signature algorithms include elliptic curve cryptography, ECC, algorithms, such as elliptic curve digital signature algorithms, ECDAs, that is supported by wireless constrained devices through LwM2M and CoAP. Some digital signature algorithms include for example hashing as part of the signing process.

According to some aspects, the credential message comprises a server credential; and the method comprises storing S6 the received server credential upon successful verification. The disclosed technique has the advantage of being less dependent on the underlying architecture and of accommodating various application-level protocols and possible intermediate gateways between the server 70 and the wireless device 60.

According to some aspects, the method 200 further comprising generating a device nonce and the authentication response comprises the device nonce. For example, in TLS with pre-shared key, the wireless device provides a random number as a nonce in ClientHello message considered herein as the authentication response.

According to some aspects, the credential message comprises a validation confirmation, or a validation error. The server 70 carries out an authentication of the wireless device 60 based on the authentication response and the DAI indicator, and sends back to the wireless device 60 a validation confirmation if the server has successfully authenticated the wireless device 60 or a validation error otherwise.

According to some aspects, the server credential is a server public key, a server certificate, a certificate authority, CA, certificate, and/or a device certificate and the SAI indicator comprises the digital signature. The step of verifying S5 the received credential message then comprises computing S52 a hash value of at least one of the server nonce, the device nonce, the plain-text, the device public key and the received server public key, and verifying S53 the received digital signature using the computed hash value and the received server public key. For example, the wireless device 60, receiving the credential message comprising the server public key, and the SAI indicator as a digital signature, calculates the hash value of the concatenation of the server nonce, the device nonce, the device public key, and the server public key. The wireless device 60 then verifies the digital signature received using the calculated hash value and the received server public key. If the signature is correct then the device stores the server public key (and possibly computes the hash value of server public key and stores the hash value). Hash values can be obtained using a hash function such as SHA-256 or SHA-3, or any other hash functions as long as it is supported by the wireless device 60 especially in constrained environments. A hash function converts an arbitrary amount of data into a fixed-length hash value. According to some aspects, the credential message comprises an encrypted version of the device certificate as server credential. When the credential message is to carry the device certificate as server credential, then the device certificate is sent in an encrypted from in the credential message using the device public key, either by the server encrypting the device certificate or the entire credential message.

According to some aspects, the SAI indicator comprises a MAC, and the step of verifying S5 the received credential message comprises verifying S54 the MAC using the device public key. For example, the server generates a MAC as SAI indicator using the device public key or key derived from the device public key. For example, verifying S54 the MAC comprises generating a MAC over the received credential message payload using the device public key or key derived from the device public key, comparing the received MAC and the generated MAC, and accepting the credential message if the received MAC matches the generated MAC.

According to some aspects, the SAI indicator comprises the MAC and the step of verifying S5 the received credential message comprises computing S55 a hash value of at least one of the server nonce, the device nonce, the plain-text, the device public key and the received server credential, and verifying the received MAC using the computed hash value and the device public key. For example, the server 70 sends the credential message comprising the SAI indicator as a MAC computed over the hash value using a key derived from a device public key (such as a hash value of the device public key). For example, the wireless device 60, receiving the credential message comprising the server public key, and the SAI indicator as a MAC, calculates the hash value of the device public key. The wireless device 60 uses the resulting hash value as a symmetric key to compute the MAC over the received credential message payload, and then verifies the MAC by comparing the received MAC and the computed MAC. If the MACs match, the wireless device 60 accepts the credential message and stores the credentials provided therein. Otherwise, the wireless device 60 discards the credential message. When the credential message sent by the server 70 comprises a hash value of a concatenation of the device nonce, the server nonce and the server public key, the wireless device 60 calculates the hash value of the concatenation of the server nonce, the device nonce, the device public key, and the server public key, before proceeding to the MAC calculation and verification.

According to some aspects, the credential message comprises a cipher-text computed by the server 70 using the device public key, and the step of verifying S5 the credential message comprises decrypting S51 the cipher-text using the device private key to obtain a plain-text. For example, the server 70 computes a hash value over the concatenation of device nonce, server nonce, and server public key, encrypts this hash value using the device public key and sends this cipher-text in the credential message. For example, the wireless device 60, receiving such a credential message comprising the cipher-text generated by the server 70 using the device public key, decrypts the encrypted hash value, and computes a hash value over the concatenation of server nonce, device nonce, and server public key and verifies that the computed hash value matches the decrypted hash value.

According to some aspects, the method 200 further comprises transmitting S11 a device identifier to the server 70 in a credential request or in the authentication response. The credential message is a credential response to the credential request. According to some aspects, the device identifier comprises a hash value computed based on the device public key. For example, the device identifier corresponds to the hash of the device public key in RPK format.

According to some aspects, the authentication request comprises server key exchange parameters configured to enable a derivation of a shared key. For example, the server key exchange parameters comprise Diffie Hellman, DH, key exchange parameters (such as a DH prime, a DH base, a DH server public key), Rivest Shamir and Adleman, RSA, key exchange parameters (such a RSA server public key). According to some aspects, the server key exchange parameters are temporary or ephemeral. The server key exchange parameters are for example used in carrying out the disclosed technique in a TLS with pre-shared key, PSK. In TLS, the Certificate message and/or the (Client/Server) KeyExchange messages are for example used to exchange server/client key exchange parameters. When DH key exchange is carried out, elliptic curve cryptography Diffie-Hellman, ECDH, is optionally used so as to be a lightweight DH key exchange suitable for constrained wireless devices.

According to some aspects, generating S2 the DAI indicator comprises generating S22a the shared key based on the device public key, the server key exchange parameters, and/or the device key exchange parameters. Generating S22a comprises for example generating the shared key based on a hash of the device public key concatenated with an arbitrary string. For example, the shared key can be computed based on a pre-master secret. The pre-master secret is for example computed based on the intermediate key K which can be generated in the following way e.g.:

$$K=\text{truncate}(H(\text{device public key}|\text{"Arbitrary string"}), n) \quad (1),$$

where H denotes a hash function, n denotes a size in which the hash value is to be truncated (such as 128 bits mandated for constrained wireless devices). In TLS-PSK, the ServerKeyExchange message and possibly a Certificate message from the server 70 conveys cryptographic information to allow the wireless device 60 to generate and/or communicate the parts of the pre-master secret via the server key exchange parameters: either an RSA public key with which to encrypt a random value generated at the device and used together with the intermediate key K in deriving the pre-master secret, or a Diffie-Hellman public key with which the wireless device can compute a DH shared key using the device DH private key and where this DH shared key is used together with the intermediate key K in deriving the pre-master secret. The shared key or master secret is then for example derived from the pre-master secret and random values comprised in the ClientHello and ServerHello messages. Example of derivation methods are provided in RFC 5246.

The device key exchange parameters for example comprise Diffie Hellman, DH, key exchange parameters (such as a DH device public key (temporary or permanent)), Rivest Shamir and Adleman, RSA, key exchange parameters (a random number encrypted using the server RSA public key). The generating S22a comprises computing the device key exchange parameters. For example, in a TLS-PSK with temporary DH key exchange, generating S22a comprises generating the device DH private and public keys based on the DH parameters from the server 70. For example, in a TLS-PSK with RSA key exchange the random value generated by the wireless device 60 is encrypted using the server RSA public key.

According to some aspects, generating S2 the DAI indicator further comprises computing S22b the DAI indicator based on the shared key, and transmitting S22c the device key exchange parameters to the server 70 in the authentication response. Computing S22b the DAI indicator based on the shared key comprises for example computing a MAC using the shared key. Computing S22b the DAI comprises for example computing a MAC using the shared key over the hash of all messages (Finished message in TLS). The shared key corresponds herein to the master secret which is generated from both the server and device key exchange parameters. Transmitting S22c comprises for example transmitting the DH device public key to the server 70. This derivation of the shared key supports perfect forward secrecy because the derivation uses temporary DH (server and device) key exchange parameters, or uses a device generated random value transferred to the server using a temporary RSA server public key. The term "temporary" herein refers to the fact that the material is generated at each new session, such as new DH key pairs and RSA server public key for each new TLS session.

According to some aspects, the method 200 further comprises receiving S7 from the server 70 a subsequent message comprising a server credential; and verifying S8 the received subsequent message using the shared key, such as using the shared key directly or using a key derived from the shared key. The subsequent message is for example secured using a SAI indicator, such as a MAC, and/or using symmetric encryption based on the shared key. According to some aspects, the subsequent message is encrypted and/or integrity protected and the step of verifying S8 the received subsequent message based on the shared key comprises decrypting the subsequent message using the shared key, and/or verifying an integrity protection indicator of the subsequent message based on the shared key, such as using the shared key directly or using a key derived from the shared key. This has the advantage that the technique complies with LwM2M standard where also TLS-PSK is an alternative for securing communication between a wireless device and a server and might already be supported in the wireless device. As long as a cipher suite providing perfect forward secrecy as described above is chosen, the complete wireless device provisioning could actually be done using the TLS-PSK session instead of first authenticating the wireless device and then provisioning the credentials.

According to some aspects, the server credential comprises a server public key, a server certificate, a certificate authority, CA, certificate for one or more servers 70 configured to communicate with the device, a device certificate, a symmetric key, and/or an identifier. A server credential comprises for example a cellular credential (such as a SIM credential, a soft SIM credential), a wireless connectivity credential (such as wireless local area network credentials), and an enterprise credential (such as for accessing the enterprise network). An identifier comprises for example an international mobile subscriber identity, IMSI, a temporary IMSI, a medium access control address, and/or universal resource identifier.

Figure 3:
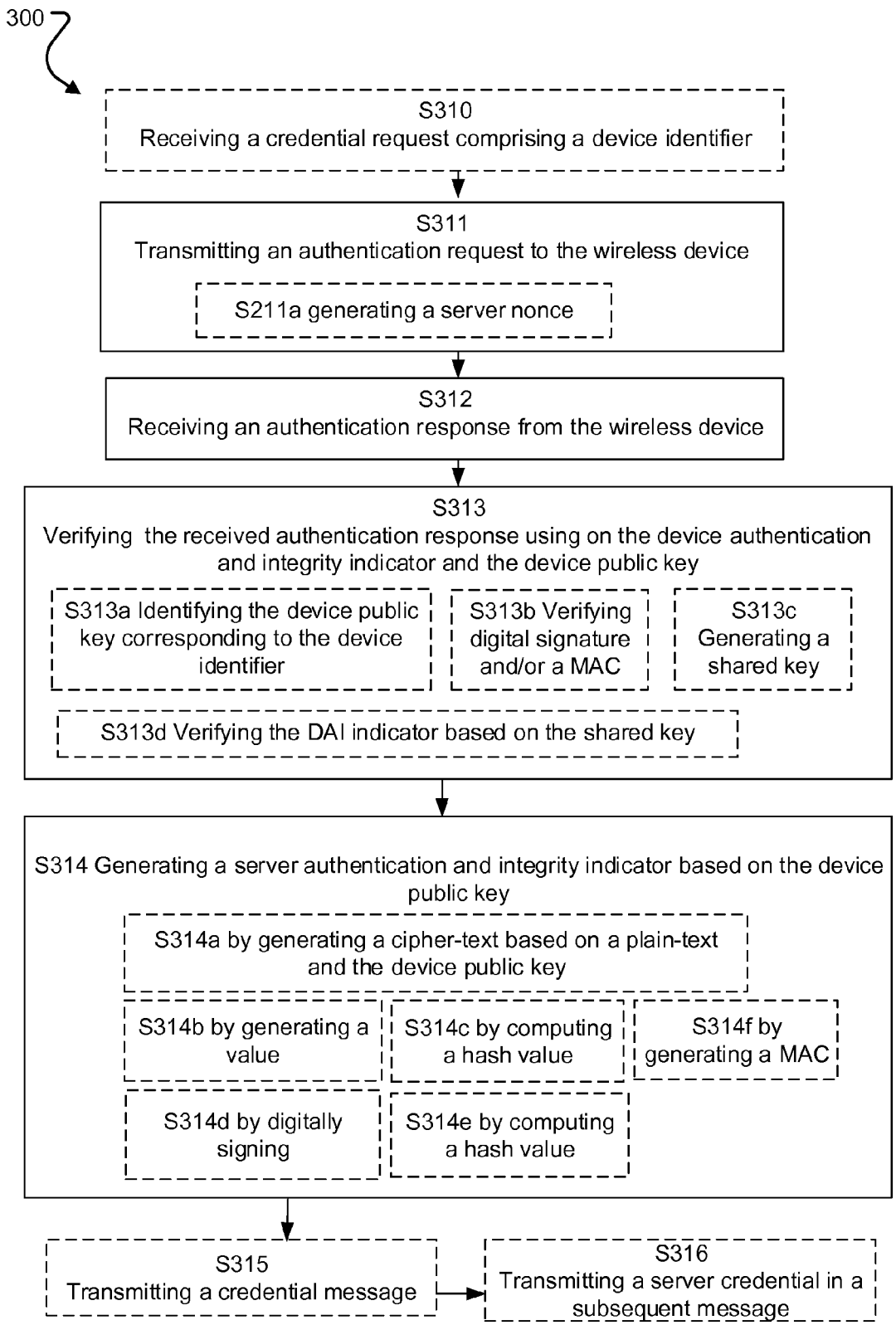
FIG. 3 is a flow chart illustrating an exemplary method, performed in a server according to this disclosure.

FIG. 3 is a flow chart illustrating an exemplary method 300, performed in a server according to this disclosure. The method 300 is for securely providing a credential to a wireless device 60. The server 70 stores a device public key for the wireless device 60, a server public key and a server private key. The manufacturer has upon purchase, provided the enterprise or purchaser of the wireless device, with the device public key, and possibly a device identifier. The enterprise then provides the device public key, and possibly the device identifier for each purchased wireless device 60 to a server 70 of the enterprise. The method 300 is performed in the server 70, when a new wireless device 60 is connected to the network 90 for the first time. The method 300 comprises transmitting S311 an authentication request to the wireless device 60. For example, in TLS with pre-shared key, the step of transmitting S311 comprises transmitting a ServerHello message, a ServerKeyExchange message, a ServerHelloDone message, and possibly a Certificate message. According to some aspects, the method 300 further comprises generating S311a a server nonce and/or the server nonce encrypted using the device public key or a key derived from the public key. When generating S311a or transmitting S311, the device public key has not been made public by the wireless device 60, by the server 70 and/or by any other possible holder of the device public key The authentication request comprises the server nonce and/or the encrypted server nonce.

The method 300 comprises receiving S312 an authentication response from the wireless device 60. The authentication response comprises a device authentication and integrity, DAI, indicator. The DAI indicator supports the server 70 in determining whether the wireless device 70 is a legitimate wireless device (i.e. whether the wireless device 70 holds the device public key). According to some aspects, the DAI indicator comprises a digital signature computed based on the device private key, and/or a message authentication code, MAC, computed based on the device public key. According to some aspects, the authentication response comprises a client nonce.

The method 300 comprises verifying S313 the received authentication response using the DAI indicator and the device public key. For example, verifying S313 the received authentication response comprises verifying the DAI indicator using the device public key, such as verifying a digital signature and/or a MAC. According to some aspects, the DAI indicator comprises a digital signature and/or a MAC, and verifying S313 the received authentication response comprises verifying S313b the digital signature and/or the MAC using the device public key.

According to some aspects, the method 300 further comprises receiving S310 a credential request from the wireless device 60, the credential request comprising a device identifier. The step of verifying S313 the received authentication response comprises identifying S313a the device public key corresponding to the device identifier which is the public key to be used in the verification of the DAI. The credential message is a credential response to the credential request. For example, the device identifier corresponds to the hash of the public key in RPK format. The server 70 holds in the memory unit 73 a list comprising for each wireless device, a device public key identified with a device identifier. This way, the server 70 can based on the received device identifier retrieve the corresponding device public key for generating the SAI indicator, and thus proving possession of the legitimate device public key. According to some aspects, the authentication response comprises a decrypted version of server nonce, and verifying S313 the received authentication response comprises verifying that the decrypted version of server nonce matches the server nonce generated by the server.

The method 300 comprises, upon successful verification of the authentication response, generating S314 a server authentication and integrity, SAI, indicator based on the device public key. The SAI indicator provides a proof of the server's possession of the device public key. The SAI indicator permits the wireless device 60 to authenticate the server 70 and to verify the integrity of the credential message. As only the legitimate server 70 holds the device public key, the SAI indicator if generated by the legitimate server permits a verification of the server's possession of the device public key and thus also a successful authentication of the server as legitimate.

According to some aspects, generating S314 the SAI indicator comprises generating a digital signature computed based on the server private key, and/or a message authentication code, MAC, computed based on the device public key.

According to some aspects, generating S314 the SAI indicator based on the device public key comprises generating S314a a cipher-text based on a plain-text and the device public key. The credential message further comprises the cipher-text. According to some aspects, generating S314 the SAI indicator based on the device public key comprises generating S314b a value computed based on at least one of the device public key, the server credential, the plain-text, the server nonce, and the device nonce. For example, the server 70 computes a hash value over the concatenation of device nonce, server nonce, and server public key, encrypts this hash value using the device public key and sends this cipher-text in the credential message.

The method 300 comprises transmitting S315 a credential message to the wireless device 60. The credential message comprises the generated SAI indicator. For example, in TLS with pre-shared key, the step of transmitting S315 comprises transmitting a ChangeCipherSpec message, and/or a Finished message to the wireless device 60.

According to some aspects, the credential message comprises a server credential. The method 300 further comprises transmitting S316 a subsequent message to the wireless device 60, the subsequent message comprising the server credential and/or an encrypted version of the server credential. The subsequent message is for example secured using a SAI indicator, such as a MAC, a digital signature or using encryption (asymmetric or symmetric). This provides a secure credential provisioning to the wireless device, i.e. robust against attacks towards integrity, and confidentiality.

According to some aspects, the SAI indicator comprises a digital signature. The step of generating S314 the SAI indicator comprises computing S314c a hash value of at least one of the server nonce, the device nonce, the plain-text, the device public key and the server public key, and digitally signing S314d the computed hash value using the server private key; and the credential message further comprises the digital signature, and/or the server credential. For example, the server generates a digital signature, as SAI indicator, of a concatenation of a server nonce, a device nonce, a device public key and a server public key, and sends the digital signature in the credential message.

According to some aspects, the SAI indicator comprises a MAC. The step of generating S314 the SAI indicator comprises computing S314e a hash value of at least one of the server nonce, the device nonce, the plain-text, the device public key and the server credential, and generating S314f the MAC over the computed hash value using the device public key. The credential message further comprises the computed MAC, and/or the server credential. For example, the server generates a MAC as SAI indicator using the device public key or key derived from the device public key. For example, the server 70 sends the credential message comprising the SAI indicator as a MAC computed over the hash value using a key derived from a device public key (such as a hash value of the device public key)

According to some aspects, the plain-text comprises a random number, a device certificate, and/or a hash of a concatenation of device nonce, server nonce and server credential.

According to some aspects, the step of verifying S313 the received authentication response comprises generating S313c a shared key based on the device public key server key exchange parameters and/or device key exchange parameters from the wireless device, and verifying S313d the DAI indicator based on the shared key. Generating S313c comprises for example generating the server key exchange parameters configured to enable a derivation of a shared key. For example, the server key exchange parameters comprise Diffie Hellman, DH, key exchange parameters (such as a DH prime, a DH base, a DH server public key), Rivest Shamir and Adleman, RSA, key exchange parameters (such a RSA server public key). According to some aspects, the server key exchange parameters are temporary or ephemeral. The server key exchange parameters are for example used in carrying out the disclosed technique in a TLS with pre-shared key, PSK. In TLS, the Certificate message and/or the (Client/Server) KeyExchange messages are for example used to transport or exchange server/client key exchange parameters between the wireless device 60 and the server 70. The server 70 is for example configured to transmit the server key exchange parameters in an authentication request. Generating S313c comprises for example generating the shared key based on a hash of the device public key concatenated with an arbitrary string. For example, the shared key can be computed based on a pre-master secret. The pre-master secret is for example computed based on the intermediate key K which can be generated following e.g. Eq. (1). In TLS-PSK, the server 70 receives in a ClientKeyExchange message cryptographic information to allow the server 70 to derive the pre-master secret via the device key exchange parameters: either a random value encrypted using the server RSA public key that the server decrypts using its RSA private key and uses together with the intermediate key K in deriving the pre-master secret, or a device Diffie-Hellman public key with which the server can compute a DH shared key using the server DH private key and where this DH shared key is used together with the intermediate key K in deriving the pre-master secret. The shared key or master secret is then for example derived from the pre-master secret and random values comprised in the ClientHello and ServerHello messages. TLS adapted with the present technique allows the wireless device 60 and server 70 to verify that their peer has calculated the same security parameters and that the key exchange occurred without tampering by an attacker.

According to some aspects, the step of transmitting S316 a server credential in a subsequent message to the wireless device 60 is performed over a channel that is encrypted and/or integrity protected using the shared key. The subsequent message is for example secured using a SAI indicator, such as a MAC, and/or using symmetric encryption based on the shared key.

According to some aspects, the server credential comprises a server public key, a server certificate, a certificate authority, CA, certificate for one or more servers 70 configured to communicate with the device, a device certificate, and/or a symmetric key.

Figure 4:
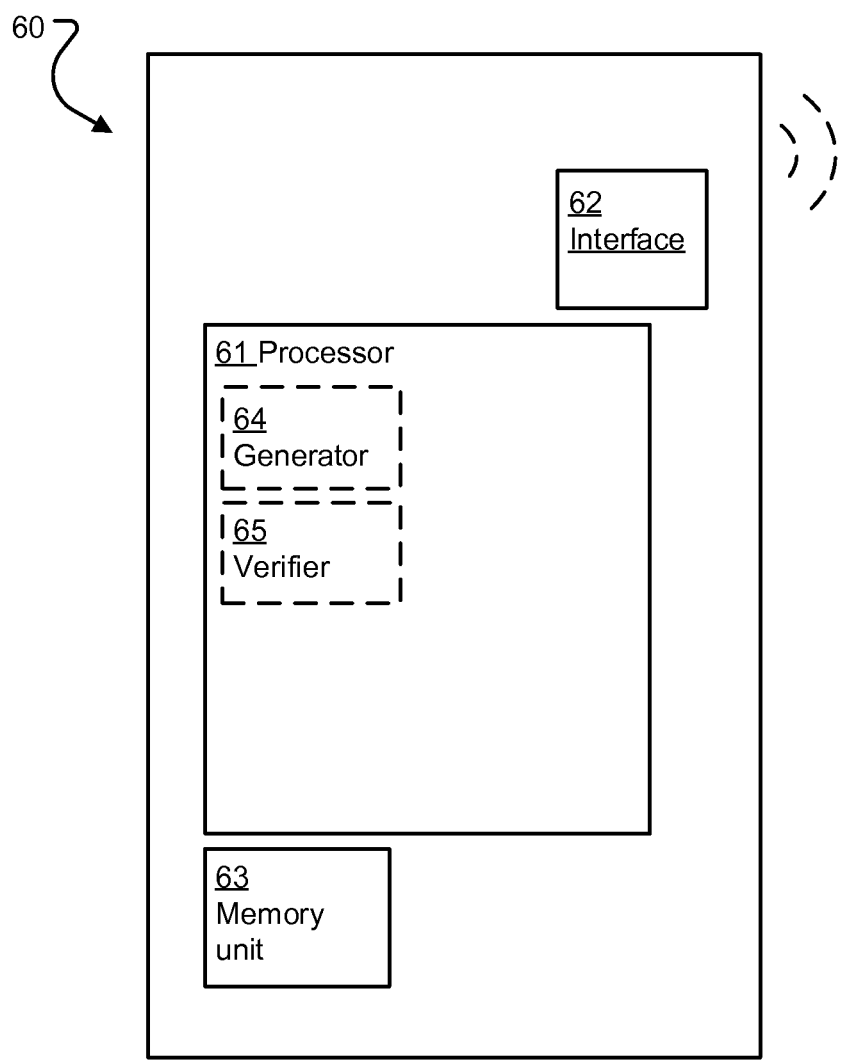
FIG. 4 is a block diagram illustrating an exemplary wireless device according to this disclosure.

FIG. 4 is a block diagram illustrating an exemplary wireless device 60 according to this disclosure. The wireless device 60 is configured to enable secure credential provisioning or reception from a server 70, such as bootstrapping credential provisioning. The wireless device 60 comprises an interface 62 configured to communicate with a server 70. The interface 62 comprises for example a wireless communication interface (such as for short-range communication, local area network communication, cellular communication) and/or a wired communication interface.

The wireless device 60 comprises a memory unit 63 having a device public key and a device private key stored thereon. The device public key has not been made public by the wireless device 60, by the server 70 and/or by any other possible holder of the device public key. The memory unit 63 is for example a data storage such as collocated data storage, a remote data storage, removable and non-removable storage including, but not limited to, Read Only Memory, ROM, Random Access Memory, RAM. The manufacturer BS provides for example the device public key and a device private key to the wireless device at manufacturing. The server 70 stores the device public key, which is for example provided to the user/enterprise by the manufacturer or retailer upon acquisition of the wireless device 60 and the user/enterprise stores them on the server 70. The device public key is unexposed at this point and mutual authentication can thus be achieved using the device public key as a shared secret.

The wireless device 60 comprises a processor 61 configured to receive an authentication request from the server 70 via the interface 62. The processor 61 refers herein to a processing unit, such as a central processing unit, a distributed processing unit. For example, in TLS with pre-shared key, the processor 61 is configured to receive, via the interface 62, a ServerHello message, a ServerKeyExchange message, a ServerHelloDone message, and possibly a Certificate message from the server 70.

The processor 61 is configured to generate a device authentication and integrity, DAI, indicator. Hence, according to some aspects, the processor 61 comprises a generator 64 configured to generate a DAI indicator. According to some aspects, the DAI indicator comprises a digital signature computed based on the device private key, and/or a message authentication code computed based on the device public key. For example, the processor 61 is configured to generate the DAI indicator as a digital signature by digitally signing the authentication response payload using the device private key. For example, the processor 61 is configured to generate the DAI indicator as a message authentication code, MAC, by generating a MAC over the authentication response payload using the device public key; or generating a key derived from the device public key and computing the MAC over the authentication response payload using the derived key.

The processor 61 is configured to transmit, via the interface 62, an authentication response to the server 70. The authentication response comprises the DAI indicator. For example, in TLS with pre-shared key, the processor 61 is configured to transmit the authentication response to the server 70 as a ClientKeyExchange message, a ChangeCipherSpec message, and/or a Finished message.

The processor 61 is configured to receive, via the interface 62, a credential message from the server 70. The credential message comprises a server authentication and integrity, SAI, indicator. The SAI indicator provides a proof of the server's possession of the device public key. As only the legitimate server 70 holds the device public key, the SAI indicator if generated by the legitimate server permits a verification of the server's possession of the device public key and thus also a successful authentication of the server as legitimate. For example, in TLS with pre-shared key, the credential message corresponds to a ChangeCipherSpec message, and/or a Finished message from the server 70.

The processor 61 is configured to verify the received credential message using the device public key. Hence, according to some aspects, the processor 61 comprises a verifier 65 configured to verify the received credential message using the device public key. For example, processor 61 is configured to verify by authenticating a sender of the credential message, i.e. the server 70, and/or by verifying integrity of the credential message, i.e. verifying that the credential message has not been tampered with. Authenticating the sender of the credential message and/or verifying integrity of the credential message is performed for example using the SAI indicator and the device public key. According to some aspects, the SAI indicator comprises a digital signature; and the step of verifying S5 the received credential message comprises verifying S53 the digital signature.

According to some aspects, the credential message comprises a server credential. The memory unit 63 is further configured to store the received server credential upon successful verification. The disclosed wireless device benefits from an optimized storage as the device public key is used as a shared secret for securing the bootstrapping and thus no dedicated additional material is needed for this purpose. The disclosed wireless device has also the advantage of being less dependent on the underlying architecture and of being adaptable to various application-level protocols and possible intermediate gateways between the server 70 and the wireless device 60.

According to some aspects, the authentication request comprises server key exchange parameters configured to enable a derivation of a shared key. For example, the server key exchange parameters comprise Diffie Hellman, DH, key exchange parameters (such as a DH prime, a DH base, a DH server public key), Rivest Shamir and Adleman, RSA, key exchange parameters (such a RSA server public key). According to some aspects, the server key exchange parameters are temporary or ephemeral. The server key exchange parameters are for example used in carrying out the disclosed technique in a TLS with pre-shared key, PSK.

According to some aspects, the processor 61 is configured to generate the DAI indicator by generating the shared key based on the device public key, the server key exchange parameters, and/or the device key exchange parameters, and by computing the DAI indicator based on the shared key, and by transmitting the device key exchange parameters to the server (70) in the authentication response. For example, the processor 61 is configured to generate the shared key based on a hash of the device public key concatenated with an arbitrary string. For example, the shared key can be computed based a pre-master secret. The pre-master secret is for example computed based on the intermediate key K which can be generated following Eq. (1). The processor 61 is configured to derive the shared key or master secret from the pre-master secret and random values comprised in the ClientHello and ServerHello messages.

According to some aspects, the processor 61 is further configured to receive from the server 70 via the interface 62 a subsequent message comprising a server credential; and to verify the subsequent message using the shared key, such as using the shared key directly or using a key derived from the shared key. The subsequent message is for example secured using a SAI indicator, such as a MAC, and/or using symmetric encryption based on the shared key.

Figure 5:
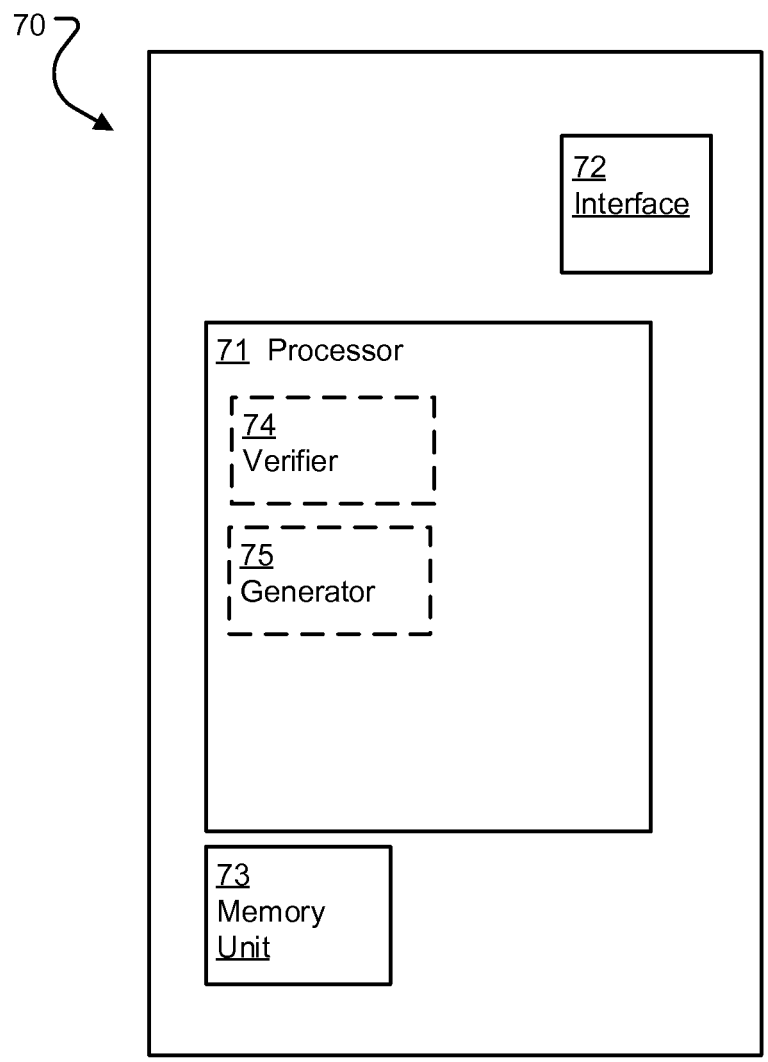
FIG. 5 is a block diagram illustrating an exemplary server according to this disclosure.

FIG. 5 is a block diagram illustrating an exemplary server 70 according to this disclosure. The server 70 is configured to securely provide a credential to a wireless device 60. The server 70 comprises an interface 72 configured to communicate with the wireless device 60. The interface 72 comprises for example an interface operatively connected to a wireless communication interfacing device (such as for short-range communication, local area network communication, cellular communication) and/or a wired communication interface. The server 70 comprises a memory unit 73 having stored a device public key for the wireless device 60, a server public key and a server private key. The device public key has not been made public by the wireless device 60, by the server 70 and/or by any other possible holder of the device public key. The memory unit 73 is for example a data storage such as a collocated data storage, a remote data storage, removable and non-removable storage including, but not limited to, Read Only Memory, ROM, Random Access Memory, RAM. The manufacturer or retailer provides for example the device public key, and possibly device identifier to the enterprise upon purchase of the wireless device. The server is then loaded with the device public key and possibly the device identifier. The server 70 stores the device public key stored the memory unit 73. The server 70 has stored in the memory unit 73 the server public key and the server private key.

The server 70 comprises a processor 71 configured to transmit, via the interface 72, an authentication request to the wireless device 60. For example, in TLS with pre-shared key, the processor 71 is configured to transmit as authentication request a ServerHello message, a ServerKeyExchange message, a ServerHelloDone message, and possibly a Certificate message.

The processor 71 is configured to receive, via the interface 72, an authentication response from the wireless device 60. The authentication response comprises a device authentication and integrity, DAI, indicator. The DAI indicator supports the server 70 in determining whether the wireless device 60 is a legitimate wireless device (i.e. whether the wireless device 60 holds the device public key). According to some aspects, the DAI indicator comprises a digital signature computed based on the device private key, and/or a message authentication code, MAC, computed based on the device public key.

The processor 71 is configured to verify the received authentication response based on the DAI indicator and the device public key. Hence, according to some aspects, the processor 71 comprises a verifier 74 configured to verify the received authentication response. For example, the processor 71 is configured to verify the DAI indicator using the device public key, such as verifying a digital signature and/or a MAC. The processor 71 is configured to generate, upon successful verification, a server authentication and integrity indicator based on the device public key. The SAI indicator provides a proof of the server's possession of the device public key. Hence, according to some aspects, the processor 71 comprises a generator 75 configured to generate the SAI indicator so as to prove possession of the device public key. The SAI indicator allows the wireless device 60 to authenticate the server 70 and to verify the integrity of the credential message. As only the legitimate server 70 holds the device public key, the server can prove to the wireless device that the server is legitimate by proving that the server holds the device public key and thus also a successful authentication of the server as legitimate. The device public key is unknown to any party other that the manufacturer, the server and the wireless device.

The processor 71 is configured to transmit, via the interface 72, a credential message to the wireless device 60. The credential message comprises the generated SAI indicator. For example, in TLS with pre-shared key, the processor 71 is configured to transmit a ChangeCipherSpec message, and/or a Finished message to the wireless device 60.

According to some aspects, the credential message comprises a server credential, and/or the processor is configured to transmit, via the interface 72, a subsequent message to the wireless device 60. The subsequent message comprises the server credential and/or an encrypted version of the server credential. The processor 71 is configured to provide confidentiality and/or integrity protection of subsequent message using a SAI indicator, such as a MAC, a digital signature or using encryption.

Figure 6:
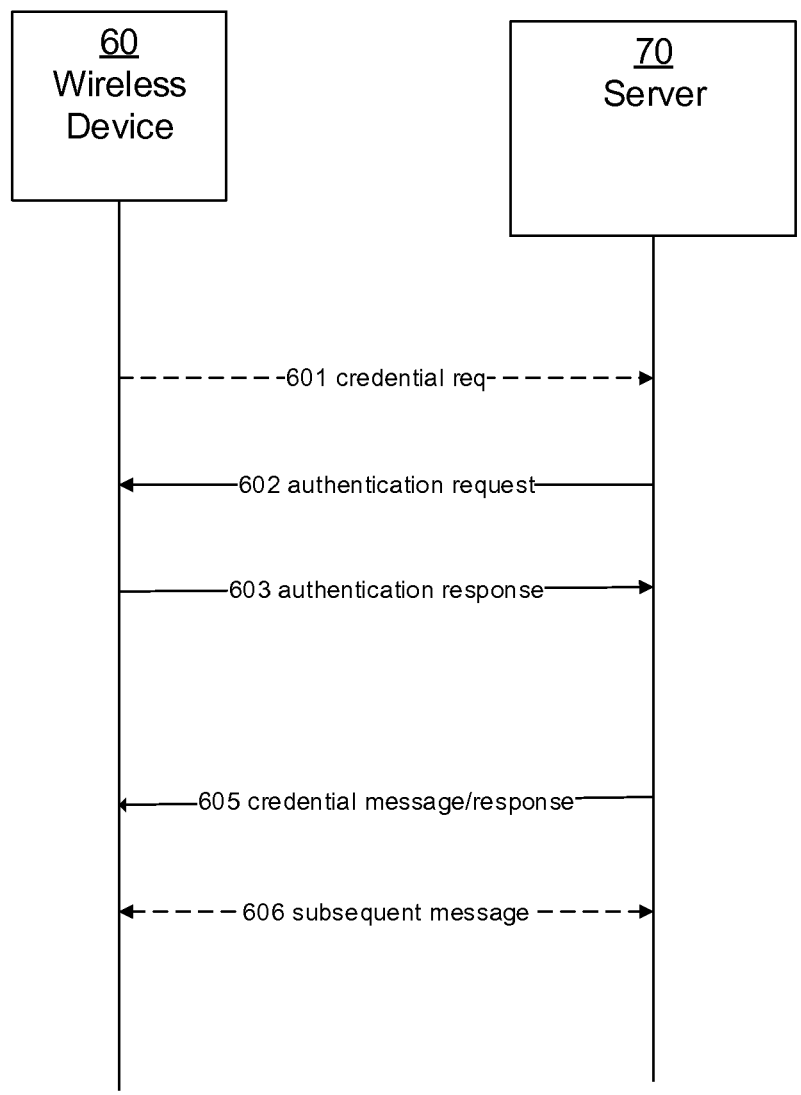
FIG. 6 is a signaling diagram illustrating an exemplary exchange of messages for enabling secure credential provisioning from the server to the wireless device according to this disclosure.

FIG. 6 is a signaling diagram illustrating an exemplary exchange of messages for enabling secure credential provisioning from the server 70 to the wireless device 60 according to this disclosure. The enablement of the secure credential provisioning starts optionally with the wireless device 60 sending S11 a credential request 601 to the server 70 for obtaining the server public key. The device identifier is included in the credential request 601 so that the server is able to identify the device and thus retrieve the device public key from the memory unit 73. The server 70 then generates S211a a random server nonce and transmits S211 the server nonce in the authentication request 602 to wireless device 60. The wireless device 60 receives S1 the authentication request 602 and prepares an authentication response 603 by signing S21 the server nonce using the device private key and generates a device nonce. The wireless device 60 sends S3 the signature together with device nonce in an authentication response 603 to the server 70. The server 70 receives S212 the authentication response and verifies S213b the received digital signature using the server nonce generated for the authentication request 602 and the device public key. If the digital signature is wrong or corrupted, the server 70 prepares a credential message or response 604 to the wireless device indicating a validation error. If the digital signature is correct or valid, the server 70 calculates S214 $c$ a hash value of the concatenation of the server nonce, the device nonce, the device public key, and the server public key. The server 70 signs S214 $c$ the hash value using the server private key and prepares a credential message or response 604 to the wireless device 60 indicating success and including the calculated signature and the server public key as server credential. The server sends S215 the prepared credential message or response 604 as a response to the device credential request for the server public key. In case of success, the wireless device 60 receives S4 the credential message 604 and verifies S5 the credential message 604 by calculating S52 a hash value of the concatenation of server nonce, device nonce, the device public key, and the server public key. The wireless device 60 then verifies S53 the signature received from the server 70 using the calculated hash value and the received server public key. If the signature is valid, then the wireless device 60 stores S6 the server public key. Hence, the server credentials have been securely provisioned in the wireless device 60.

When the certificate mode is used in TLS the wireless device 60 needs to be configured with appropriate CA certificates for validation of the server certificate received as part of the DTLS handshake. Furthermore, the wireless device 70 needs to be provisioned with a device certificate to be presented to the server for validation. Note that since the device certificate contains the device public key it cannot be sent in clear from the server 70 to the wireless device 60 but must instead be encrypted during the transfer. If the device certificate is to be transmitted to the wireless device 60, an alternative to sending an encrypted device certificate is for example to substitute the part of the device certificate that corresponds to the device public key with arbitrary values (such as zeroes) and then have the wireless device 60 substitute the arbitrary values with the device public key at reception. Another alternative is for example to simply skip sending the bytes corresponding to the device public key and have the wireless device insert them. This is to avoid that any attacker can obtain the device public key and fool the wireless device 70 into accepting rogue credentials. The proposed method for secure delivery of the CA and device certificates needed for secure TLS session with the server 70 involves generating a random symmetric key and encrypting the device certificate using the symmetric key using e.g. advanced encryption standard, AES, encryption when the server 70 receives the authentication response 603 and prepares the credential message 604. The symmetric key is then wrapped using the device public key. The server 70 computes the digital signature over the concatenation of the computed hash value, the CA certificate, and the encrypted device certificate. The computed hash value is for example generated based on at least one of the server nonce, the device nonce, the plain-text, the device public key and the server public key. The credential message 604 to the wireless device 60 also includes the CA certificate, the encrypted client certificate, and the wrapped symmetric key. The wireless device 60 receiving such a credential message includes the CA certificate and encrypted client certificate when validating the signature, and un-wraps the symmetric key by decrypting the wrapped symmetric key using the device private key. The wireless device 60 decrypts the encrypted device certificate using the symmetric key. The wireless device 60 stores in the memory unit 63 the CA certificate and the client certificate, in case of correct signature.

Figure 7:
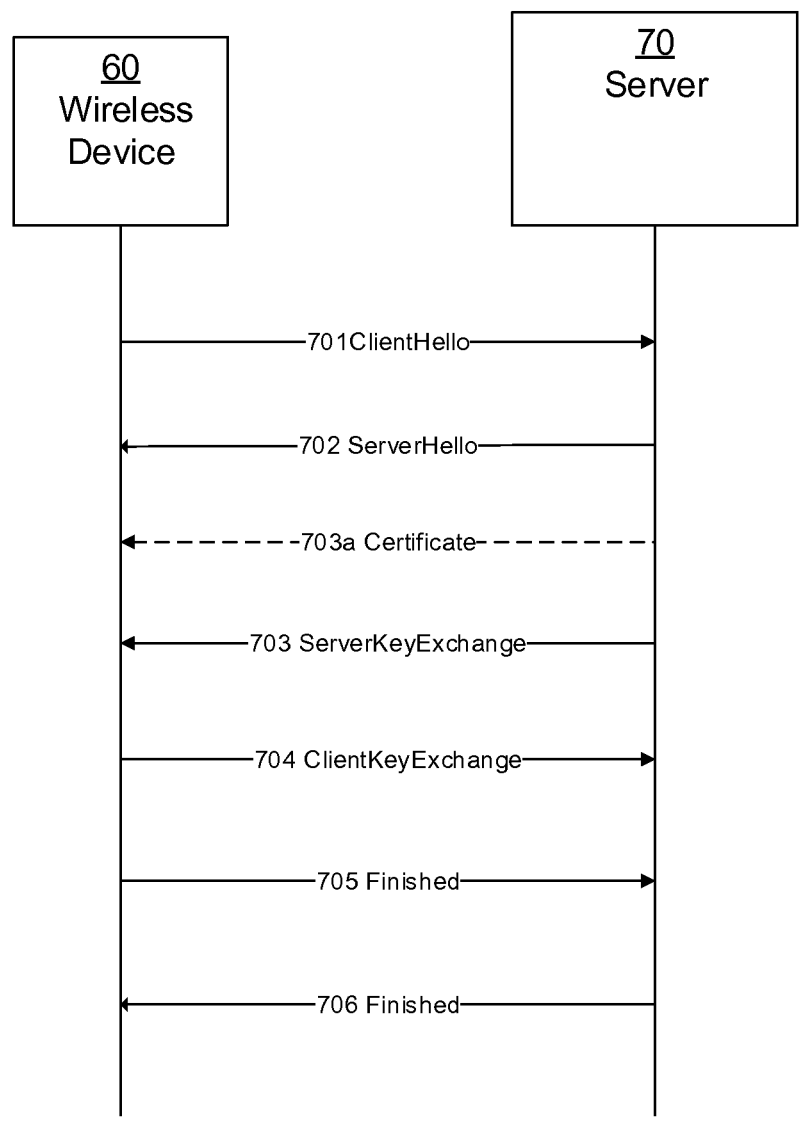
FIG. 7 is a signaling diagram illustrating an exemplary TLS exchange of messages for enabling secure credential provisioning from the server to the wireless device according to this disclosure.

FIG. 7 is a signaling diagram illustrating an exemplary TLS exchange of messages for enabling secure credential provisioning from the server to the wireless device according to this disclosure. The TLS exchange/handshake protocol involves the following steps: Exchange hello messages to agree on algorithms, exchange random values, and check for session resumption; Exchange the necessary cryptographic parameters to allow the wireless device 60 and server 70 to agree on a premaster secret; Exchange certificates and cryptographic information to allow the wireless device 60 and server 70 to authenticate themselves; generate a master secret from the premaster secret and exchanged random values.

The wireless device 60 sends in e.g. step S1 a ClientHello message 701 to which the server 70 responds with a ServerHello message 702, or else a fatal error occurs and the connection is dropped. The ClientHello and ServerHello are used to establish security enhancement capabilities between the wireless device 60 and server. The ClientHello message 701 may comprise a random value as a device nonce. The ServerHello message 702 may comprise a random value as a server nonce. The server 70 sends in step 311 a ServerKeyExchange message 703 and possibly a Certificate message 703a (and possibly ServerHelloDone message, indicating that the hello-message phase of the handshake is complete) to the wireless device 60 to allow the wireless device 60 and server 70 to agree upon a shared secret. The ServerHello message, the Certificate message 703a, the ServerKeyExchange message, and/or the ServerHelloDone message correspond to the authentication request 602 disclosed herein. The wireless device 60 sends in e.g. step S3 a ClientKeyExchange message 704 (and possibly a ChangeCipherSpec message) and a client Finished 705 message to the server 70 as an authentication response 603 disclose herein. Upon successful authentication of the wireless device 60 (i.e., successful verification of the Finished message), the server 70 sends e.g. in step S315 to the wireless device 60 a server Finished message 706 as a credential message 604 disclosed herein. The wireless device 60 verifies the server Finished message 706. The wireless device 60 then is able to receive e.g. in step S7 and/or transmit from the server 70 a subsequent message 707 comprising a server credential and the server 70 and/or the wireless device 60 are able to verify (step S8 for the wireless device) the received subsequent message 707 using the shared key. The subsequent message 707 is for example encrypted and/or integrity protected and verifying the received subsequent message 707 based on the shared key comprises decrypting the subsequent message 707 using the shared key, and/or verifying an integrity protection indicator of the subsequent message 707 based on the shared key. Hence, the wireless device 60 and the server 70 are able to benefit from a secure communication channel.

It should be appreciated that FIGS. 1-7 comprises some modules or operations which are illustrated with a darker border and some modules or operations which are illustrated with a dashed border. The modules or operations which are comprised in a darker border are modules or operations which are comprised in the broadest example embodiment. The modules or operations which are comprised in a dashed border are example embodiments which may be comprised in, or a part of, or are further modules or further operations which may be taken in addition to the modules or operations of the darker border example embodiments. It should be appreciated that operations need not be performed in order. Furthermore, it should be appreciated that not all of the operations need to be performed. The example operations may be performed in any order and in any combination.

It should be appreciated that the example operations of FIGS. 2 and 3 may be performed simultaneously for any number of components and apparatuses.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "components", "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory, ROM, Random Access Memory, RAM, compact discs, CDs, digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method, performed in a wireless device, for enabling a secure provisioning of a credential from a server, the wireless device storing a device public key and a device private key, the server storing the device public key, the method comprising:
receiving an authentication request from the server;
generating a device authentication and integrity (DAI) indicator;
transmitting an authentication response to the server, the authentication response comprising the DAI indicator;
receiving a credential message from the server, the credential message comprising a server authentication and integrity (SAI) indicator; wherein the SAI indicator provides a proof of the server's possession of the device public key; and
verifying the received credential message using the device public key.

2. The method of claim 1:
wherein the credential message comprises a server credential; and
wherein the method further comprises storing the received server credential upon successful verification.

3. The method of claim 2:
wherein the server credential is a server public key, a server certificate, a certificate authority, CA, certificate, and/or a device certificate;
wherein the SAI indicator comprises the digital signature; and
wherein verifying the received credential message comprises:
computing a hash value of at least one of a server nonce, a device nonce, plain-text, the device public key, and the received server public key; and
verifying the received digital signature using the computed hash value and the received server public key.

4. The method of claim 3, wherein the plain-text comprises a random number, a device certificate, and/or a hash of a concatenation of the device nonce, the server nonce, and the server credential.

5. The method of claim 2:
wherein the SAI indicator comprises a Message Authentication Code (MAC);
wherein verifying the received credential message comprises:
computing a hash value of at least one of a server nonce, a device nonce, plain-text, the device public key, and the received server credential; and
verifying the received MAC using the computed hash value and the device public key.

6. The method of claim 2, wherein the server credential comprises a server public key, a server certificate, a certificate authority (CA) certificate for one or more servers configured to communicate with the device, a device certificate, a symmetric key, and/or an identifier.

7. The method of claim 2, wherein the credential message comprises an encrypted version of the device certificate as server credential.

8. The method of claim 1, wherein the DAI indicator comprises a digital signature computed based on the device private key, and/or a Message Authentication Code computed based on the device public key.

9. The method of claim 1:
wherein the credential message comprises a cipher-text computed by the server using the device public key; and
wherein verifying the credential message comprises decrypting the cipher-text using the device private key to obtain a plain-text.

10. The method of claim 1:
wherein the authentication request comprises a server nonce; and
wherein generating the DAI indicator comprises generating a digital signature over the server nonce using the device private key and/or a Message Authentication Code over the server nonce using the device public key.

11. The method of claim 1:
wherein the authentication request comprises a server nonce encrypted using the device public key or a key derived from the device public key;
wherein generating the DAI indicator comprises decrypting the encrypted server nonce using the device private key or a key derived from the device public key; and
returning the server nonce in the authentication response.

12. The method of claim 1:
wherein the SAI indicator comprises a digital signature; and
wherein verifying the received credential message comprises verifying the digital signature.

13. The method of claim 1:
further comprising generating a device nonce; and
wherein the authentication response comprises the device nonce.

14. The method of claim 1, wherein the credential message comprises a validation confirmation, or a validation error.

15. The method of claim 1:
wherein the SAI indicator comprises a Message Authentication Code (MAC);
wherein verifying the received credential message comprises verifying the MAC using the device public key.

16. The method of claim 1:
further comprising transmitting a device identifier to the server in a credential request or in the authentication response;
wherein the credential message is a credential response to the credential request.

17. The method of claim 16, wherein the device identifier comprises a hash value computed based on the device public key.

18. The method of claim 1, wherein the authentication request comprises server key exchange parameters configured to enable a derivation of a shared key.

19. The method of claim 18, wherein generating the DAI indicator comprises:
generating the shared key based on the device public key, the server key exchange parameters, and/or device key exchange parameters;
computing the DAI indicator based on the shared key; and
transmitting the device key exchange parameters to the server in the authentication response.

20. The method of claim 18, the method further comprising:
receiving, from the server, a subsequent message comprising a server credential;
verifying the received subsequent message using the shared key.

21. The method of claim 20:
wherein the subsequent message is encrypted and/or integrity protected;
wherein verifying the received subsequent message based on the shared key comprises decrypting the subsequent message using the shared key, and/or verifying an integrity protection indicator of the subsequent message based on the shared key.

22. A method, performed in a server, for securely providing a credential to a wireless device; the server storing a device public key for the wireless device, a server public key, and a server private key; the method comprising:
transmitting an authentication request to the wireless device;
receiving an authentication response from the wireless device, the authentication response comprising a device authentication and integrity (DAI) indicator;
verifying the received authentication response using the DAI indicator and the device public key; and
upon successful verification of the authentication response:
generating a server authentication and integrity (SAI) indicator based on the device public key; wherein the SAI indicator provides a proof of the server's possession of the device public key; and
transmitting a credential message to the wireless device, the credential message comprising the generated SAI indicator.

23. The method of claim 22, wherein at least one of:
the credential message comprises a server credential;
the method further comprises transmitting a subsequent message to the wireless device, the subsequent message comprising the server credential and/or an encrypted version of the server credential.

24. The method of claim 22:
further comprising receiving a credential request from the wireless device, the credential request comprising a device identifier;
wherein the verifying the received authentication response comprises identifying the device public key corresponding to the device identifier; and
wherein the credential message is a credential response to the credential request.

25. The method of claim 22, wherein the generating the SAI indicator comprises generating a digital signature computed based on the server private key, and/or a Message Authentication Code (MAC) computed based on the device public key.

26. The method of claim 22:
further comprising generating a server nonce and/or the server nonce encrypted using the device public key or a key derived from the public key; and
wherein the authentication request comprises the server nonce and/or the encrypted server nonce.

27. The method of claim 26:
wherein the authentication response comprises a decrypted version of the server nonce;
wherein the verifying the received authentication response comprises verifying that the decrypted version of the server nonce matches the server nonce generated by the server.

28. The method of claim 22, wherein the authentication response comprises a device nonce.

29. The method of claim 22:
wherein the generating the SAI indicator based on the device public key comprises generating a cipher-text based on a plain-text and the device public key, and wherein the credential message further comprises the cipher-text.

30. The method of claim 22, wherein the generating the SAI indicator based on the device public key comprises generating a value computed based on at least one of the device public key, the server credential, plain-text, a server nonce, and a device nonce.

31. The method of claim 22:
wherein the SAI indicator comprises a digital signature;
wherein the generating the SAI indicator comprises:
computing a hash value of at least one of a server nonce, a device nonce, plain-text, the device public key, and the server public key; and
digitally signing the computed hash value using the server private key;
wherein the credential message further comprises the digital signature and/or the server credential.

32. The method of claim 22:
wherein the SAI indicator comprises a Message Authentication Code (MAC);
wherein the generating the SAI indicator comprises:
computing a hash value of at least one of a server nonce, a device nonce, plain-text, the device public key, and the server credential; and
generating the MAC over the computed hash value using the device public key;
wherein the credential message further comprises the computed MAC and/or the server credential.

33. The method of claim 22:
wherein the DAI indicator comprises a digital signature and/or a Message Authentication Code (MAC);
wherein the verifying the received authentication response comprises verifying the digital signature and/or the MAC using the device public key.

34. The method of claim 22, wherein the verifying the received authentication response comprises:
generating a shared key based on the device public key, server key exchange parameters, and/or device key exchange parameters from the wireless device;
verifying the DAI indicator based on the shared key.

35. The method of claim 34, wherein the transmitting a server credential in a subsequent message to the wireless device is performed over a channel that is encrypted and/or integrity protected using the shared key.

36. The method of claim 22, wherein the server credential comprises a server public key, a server certificate, a certificate authority (CA) certificate for one or more servers configured to communicate with the device, a device certificate, and/or a cellular credential.

37. A wireless device, comprising:
an interface configured to communicate with a server;
memory having a device public key and a device private key stored therein;
a processor configured to:
receive an authentication request from the server via the interface;
generate a device authentication and integrity (DAI) indicator;
transmit, via the interface, an authentication response to the server, the authentication response comprising the DAI indicator;
receive, via the interface, a credential message from the server, the credential message comprising a server authentication and integrity (SAI) indicator; wherein the SAI indicator provides a proof of the server's possession of the device public key; and
verify the received credential message using the device public key.

38. The wireless device of claim 37, wherein:
the credential message comprises a server credential; and
the memory is configured to store the received server credential upon successful verification.

39. The wireless device of claim 37, wherein the authentication request comprises server key exchange parameters configured to enable a derivation of a shared key.

40. The wireless device of claim 39, wherein the processor is configured to:
receive, from the server and via the interface, a subsequent message comprising a server credential; and
verify the subsequent message using the shared key.

41. The wireless device of claim 37, wherein the processor is configured to generate the DAI indicator by:
generating the shared key based on the device public key and/or the server key exchange parameters;
computing the DAI indicator based on the shared key and/or device key exchange parameters;
transmit, via the interface, the device key exchange parameters to the server in the authentication response.

42. A server for securely providing a credential to a wireless device, the server comprising:
an interface configured to communicate with the wireless device;
memory having stored therein a device public key for the wireless device, a server public key, and a server private key;
a processor configured to:
transmit, via the interface, an authentication request to the wireless device;
receive, via the interface, an authentication response from the wireless device, the authentication response comprising a device authentication and integrity (DAI) indicator;
verify the received authentication response based on the DAI indicator and the device public key; and
upon successful verification:
generate a server authentication and integrity indicator (SAI) based on the device public key, wherein the SAI indicator provides a proof of the server's possession of the device public key; and
transmit, via the interface, a credential message to the wireless device, the credential message comprising the generated SAI indicator.

43. The server of claim 42, wherein at least one of:
the credential message comprises a server credential;
the processor is configured to transmit, via the interface, a subsequent message to the wireless device, the subsequent message comprising the server credential and/or an encrypted version of the server credential.

44. A computer program product stored in a non-transitory computer readable medium for enabling a wireless device to handle secure provisioning of a credential from a server; the wireless device storing a device public key and a device private key; the server storing the device public key; the computer program product comprising software instructions which, when run on one or more processors of the wireless device, causes the wireless device to:
receive an authentication request from the server;
generate a device authentication and integrity (DAI) indicator;
transmit an authentication response to the server, the authentication response comprising the DAI indicator;
receive a credential message from the server, the credential message comprising a server authentication and integrity (SAI) indicator; wherein the SAI indicator provides a proof of the server's possession of the device public key; and verify the received credential message using the device public key.

45. A computer program product stored in a non-transitory computer readable medium for enabling a server to securely provide a credential to a wireless device; the server storing a device public key for the wireless device, a server public key, and a server private key; the computer program product comprising software instructions which, when run on one or more processors of the server, causes the server to:

transmit an authentication request to the wireless device;

receive an authentication response from the wireless device, the authentication response comprising a device authentication and integrity (DAI) indicator;

verify the received authentication response using the DAI indicator and the device public key; and upon successful verification of the authentication response:

generate a server authentication and integrity (SAI) indicator based on the device public key; wherein the SAI indicator provides a proof of the server's possession of the device public key; and transmit a credential message to the wireless device, the credential message comprising the generated SAI indicator.

* * * * *

UNITED STATES PATENT AND TRADEMARK OFFICE
CERTIFICATE OF CORRECTION

PATENT NO. : 9,565,172 B2
APPLICATION NO. : 14/654583
DATED : February 7, 2017
INVENTOR(S) : Ståhl Page 1 of 4

It is certified that error appears in the above-identified patent and that said Letters Patent is hereby corrected as shown below:

On the Title Page

Below item (86), insert item -- (87) PCT Pub. No: WO2016/202375
PCT Pub. Date: Dec. 22, 2016 --.

Item (56), under "U.S. PATENT DOCUMENTS", in Column 2, Line 2, delete "Rajagopalan" and insert -- Rajagopalan et al. --, therefor.

In the Figure, for Step "S1", in Line 1, delete "request," and insert -- request --, therefor.

In the Figure, should be corrected to read:

Signed and Sealed this
Twenty-fifth Day of December, 2018

Andrei Iancu
*Director of the United States Patent and Trademark Office*

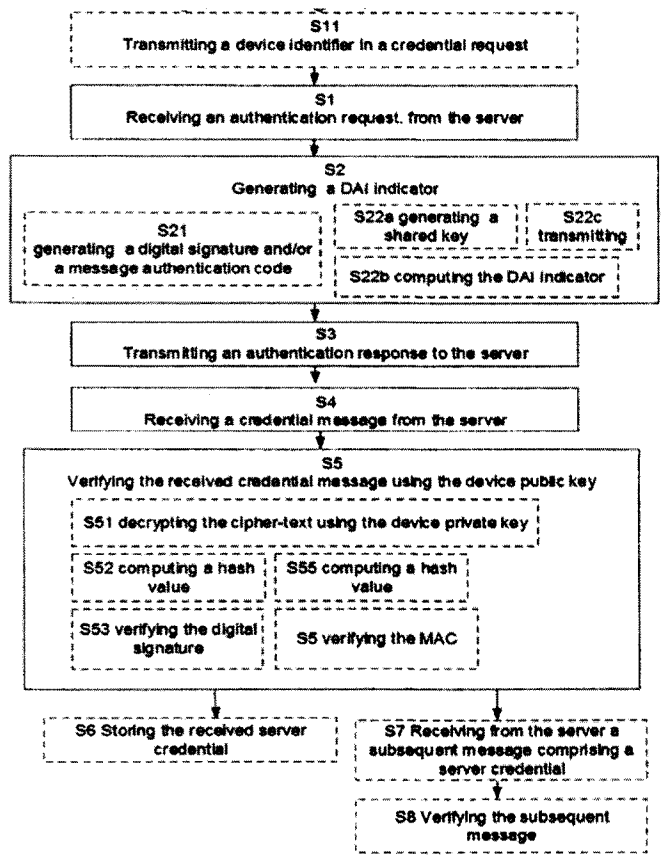
--                                                                               --, therefor.
On Page 2, item (56), under "U.S. PATENT DOCUMENTS", in Column 1, Line 6, delete "Schell" and insert -- Schell et al. --, therefor.
In the Drawings
In Fig. 2, Sheet 2 of 7, for Step "S1", in Line 1, delete "request," and insert -- request --, therefor.

CERTIFICATE OF CORRECTION (continued)
U.S. Pat. No. 9,565,172 B2

In Fig. 2, Sheet 2 of 7, should read:

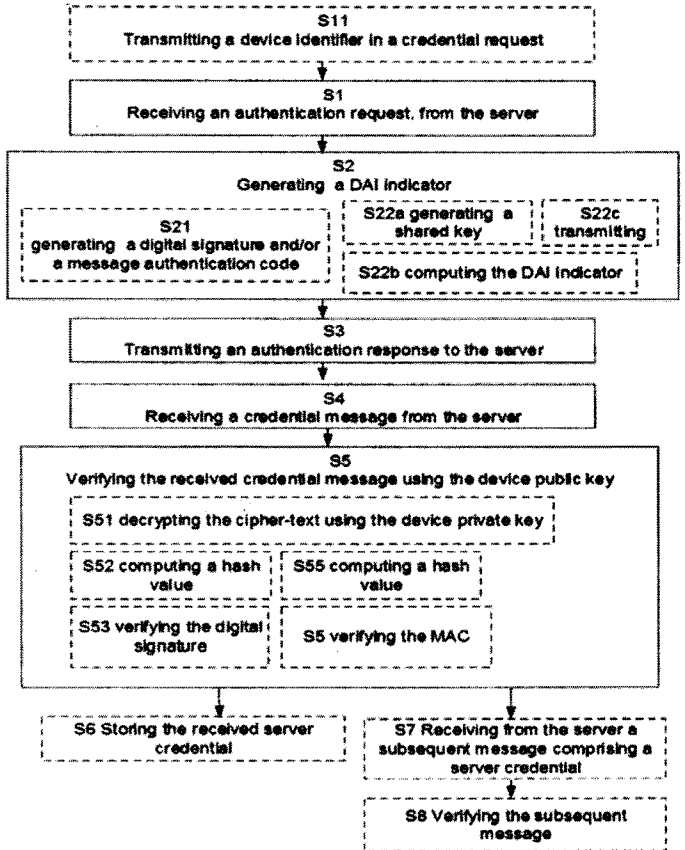

--                                                                               --, therefor.

In Fig. 3, Sheet 3 of 7, delete Step "S211a" and insert Step -- S311a --, therefor.

In Fig. 3, Sheet 3 of 7, for Step "S313", in Line 1, delete "using on" and insert -- using --, therefor.

In Fig. 6, Sheet 6 of 7, delete Tag "605" and insert Tag -- 604 --, therefor.

In the Specification

In Column 1, Line 52, delete "DTLS" and insert -- DTLS, --, therefor.

In Column 5, Line 26, delete "logic" and insert -- gate --, therefor.

In Column 5, Line 62, delete "man-in-the middle" and insert -- man-in-the-middle --, therefor.

In Column 8, Line 37, delete "WCDMA" and insert -- WCDMA, --, therefor.

In Column 10, Line 29, delete "ECDAs," and insert -- ECDSAs, --, therefor.

In Column 11, Line 15, delete "from" and insert -- form --, therefor.

CERTIFICATE OF CORRECTION (continued)
U.S. Pat. No. 9,565,172 B2

In Column 12, Line 27, delete "curve cryptography" and insert -- curve --, therefor.

In Column 14, Line 24, delete "key" and insert -- key. --, therefor.

In Column 14, Line 31, delete "wireless device 70" and insert -- wireless device 60 --, therefor.

In Column 14, Lines 32-33, delete "wireless device 70" and insert -- wireless device 60 --, therefor.

In Column 16, Line 8, delete "key)" and insert -- key). --, therefor.

In Column 18, Line 54, delete "server (70)" and insert -- server 70 --, therefor.

In Column 20, Line 30, delete "S211" and insert -- S311 --, therefor.

In Column 20, Line 38, delete "S213b" and insert -- S313b --, therefor.

In Column 20, Line 42, delete "response 604" and insert -- response 605 --, therefor.

In Column 20, Line 44, delete "S214 c" and insert -- S314 c --, therefor.

In Column 20, Line 47, delete "S214 c" and insert -- S314 c --, therefor.

In Column 20, Line 49, delete "response 604" and insert -- response 605 --, therefor.

In Column 20, Line 51, delete "S215" and insert -- S315 --, therefor.

In Column 20, Line 52, delete "response 604" and insert -- response 605 --, therefor.

In Column 20, Line 55, delete "response 604" and insert -- response 605 --, therefor.

In Column 21, Line 1, delete "device 70" and insert -- device 60 --, therefor.

In Column 21, Line 16, delete "wireless device 70" and insert -- wireless device 60 --, therefor.

In Column 21, Line 23, delete "message 604." and insert -- message 605. --, therefor.

In Column 21, Line 30, delete "message 604" and insert -- message 605 --, therefor.

In Column 22, Line 13, delete "message 604" and insert -- message 605 --, therefor.

In Column 22, Line 28, delete "comprises" and insert -- comprise --, therefor.